(12) United States Patent
Nishigai et al.

(10) Patent No.: US 9,084,018 B2
(45) Date of Patent: Jul. 14, 2015

(54) PROGRAM GUIDE DISPLAY APPARATUS

(75) Inventors: Takanobu Nishigai, Yokohama (JP);
Yoshiyuki Ban, Yokohama (JP); Satoshi Kawaji, Yokohama (JP); Makoto Chishima, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 13/060,561

(22) PCT Filed: Aug. 27, 2009

(86) PCT No.: PCT/JP2009/065003
§ 371 (c)(1),
(2), (4) Date: Feb. 24, 2011

(87) PCT Pub. No.: WO2010/024355
PCT Pub. Date: Mar. 4, 2010

(65) Prior Publication Data
US 2011/0154398 A1 Jun. 23, 2011

(30) Foreign Application Priority Data
Aug. 28, 2008 (JP) .................. 2008-219658

(51) Int. Cl.
*H04N 21/472* (2011.01)
*H04N 5/782* (2006.01)
*H04N 21/414* (2011.01)
(Continued)

(52) U.S. Cl.
CPC ......... *H04N 21/47214* (2013.01); *H04N 5/782* (2013.01); *H04N 21/41407* (2013.01); *H04N 21/4334* (2013.01); *H04N 21/4436* (2013.01)

(58) Field of Classification Search
None
See application file for complete search history.

(56) References Cited

U.S. PATENT DOCUMENTS

2002/0144264 A1 10/2002 Broadus
2003/0142087 A1* 7/2003 Shiotsu et al. ............... 345/211
(Continued)

FOREIGN PATENT DOCUMENTS

| JP | A-2003-219296 | 7/2003 |
| JP | A-2005-080385 | 3/2005 |

(Continued)

OTHER PUBLICATIONS

International Search Report in International Application No. PCT/JP2009/065003; dated Dec. 1, 2009 (with English-language translation).

(Continued)

*Primary Examiner* — Cai Chen
(74) *Attorney, Agent, or Firm* — Oliff PLC

(57) ABSTRACT

The portable terminal includes a receiving unit for selecting a channel and receiving a program, an obtaining unit for obtaining the program guide for each channel received by the receiving unit, a display unit for displaying the program guide obtained by the obtaining unit, a memory for storing setting information set up to view the program received by the receiving unit, a remaining battery capacity detecting unit for detecting the remaining capacity of the battery, and a control unit for determining the possible viewing time according to the operation mode stored in the memory and the remaining capacity of the battery detected by the remaining battery capacity detecting unit and controlling the display unit so as to identifiably display the possible viewing segment corresponding to the possible viewing time in the program guide.

10 Claims, 11 Drawing Sheets

(51) Int. Cl.
*H04N 21/433* (2011.01)
*H04N 21/443* (2011.01)

(56) References Cited

U.S. PATENT DOCUMENTS

| | | | |
|---|---|---|---|
| 2005/0046390 A1 | 3/2005 | Kimura | |
| 2006/0048184 A1* | 3/2006 | Poslinski et al. | 725/45 |
| 2007/0127882 A1* | 6/2007 | Yamada et al. | 386/83 |
| 2008/0129521 A1* | 6/2008 | Yoon | 340/636.1 |

FOREIGN PATENT DOCUMENTS

| | | | | |
|---|---|---|---|---|
| JP | 2007-0124534 | * | 5/2007 | 5/76 |
| JP | A-2007-124534 | | 5/2007 | |
| JP | A-2007-317275 | | 12/2007 | |

OTHER PUBLICATIONS

Apr. 17, 2012 Notification of Reasons for Refusal issued in Japanese Patent Application No. 2008-219658 (with English translation).

Sep. 6, 2012 Office Action issued in Chinese Patent Application No. 200980133448.8; with English-language translation.

Aug. 27, 2012 Office Action issued in Korean Patent Application No. 10-2011-7004418 (with English Translation).

Jun. 27, 2013 Office Action issued in Chinese Patent Application No. 200980133448.8 (with translation).

Jan. 13, 2014 Office Action issued in Chinese Patent Application No. 200980133448.8 (with Concise Explanation).

Feb. 27, 2013 Office Action issued in Korean Patent Application No. 10-2011-7004418 (with translation).

* cited by examiner

FIG. 4

| | 17 O'clock | 18 O'clock | 19 O'clock | 20 O'clock | 21 O'clock | 22 O'clock |
|---|---|---|---|---|---|---|
| February 29 | | | | | | |
| D1 xx TV | Broadcast Program 1 | Broadcast Program 2 | | Broadcast Program 3 | Broadcast Program 4 | Broadcast Program 5 |
| D3 yy TV | Broadcast Program 6 | | Broadcast Program 7 | | Broadcast Program 8 | |
| D7 zz TV | Broadcast Program 9 | | Broadcast Program 10 | Broadcast Program 11 | Broadcast Program 12 | |
| M12 Movie Ch | Broadcast Program 13 | | Broadcast Program 14 | | Broadcast Program 15 | |
| M18 Sports Ch | Broadcast Program 16 | | Broadcast Program 17 | | | |
| 5/14 | Menu:0 | Previous Page:* | Next Page:# | Display Operation Mode:1 | 60 Minutes Remaining | 2/29 17:12 |

V13, V12, V11, V14, V15, V16, V17, V18, V19, V20

 : Viewable Time Determined Based on Remaining Battery Level from Current Time (17:12)

FIG. 9

| February 29 | 17 O'clock | 18 O'clock | 19 O'clock | 20 O'clock | 21 O'clock | 22 O'clock |
|---|---|---|---|---|---|---|
| D1 xx TV | Broadcast Program 1 | Broadcast Program 2 | | Broadcast Program 3 | Broadcast Program 4 | Broadcast Program 5 |
| D3 yy TV | Broadcast Program 6 | | Broadcast Program 7 | | Broadcast Program 8 | |
| D7 zz TV | Broadcast Program 9 | | Broadcast Program 10 | Broadcast Program 11 | Broadcast Program 12 | |
| M12 Movie Ch | | Broadcast Program 13 | Broadcast Program 14 | | Broadcast Program 15 | |
| M18 Sports Ch | Broadcast Program 16 | | Broadcast Program 17 | | | |
| 5/14 | Menu:0 | Previous Page:* | Next Page:# | Display Operation Mode:2 | 30 Minutes Remaining | 2/29 17:12 |

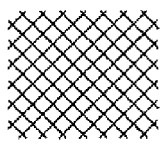 Video Recordable Time (Recordable Time) of Channels D1, D3 and D7 from Current Time (17:12)

 Video Recordable Time (Recordable Time) of Channels M12 and M18 from Current Time (17:12)

FIG. 10
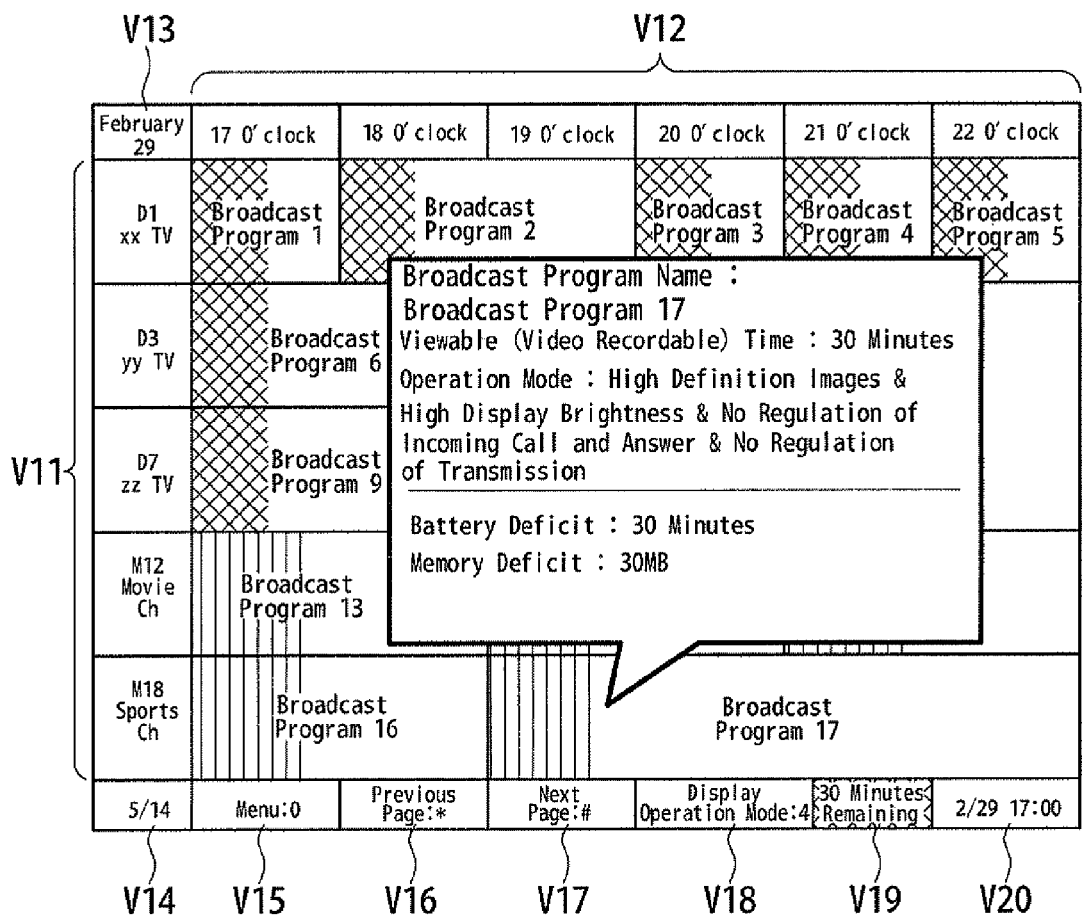
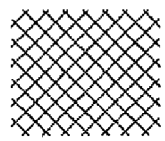 Recordable Time of Each Broadcast Program of Channels D1, D3 and D7
 Recordable Time of Each Broadcast Program of Channels M12 and M18

FIG. 11

| | February 29 | 17 O'clock | 18 O'clock | 19 O'clock | 20 O'clock | 21 O'clock | 22 O'clock |
|---|---|---|---|---|---|---|---|
| | D1 xx TV | Broadcast Program 1 | Broadcast Program 2 | | Broadcast Program 3 | Broadcast Program 4 | Broadcast Program 5 |
| | D3 yy TV | Broadcast Program 6 | | Broadcast Program 7 | | Broadcast Program 8 | |
| | D7 zz TV | Broadcast Program 9 | Broadcast Program 10 | Broadcast Program 11 | | Broadcast Program 12 | |
| | M12 Movie Ch | Broadcast Program 13 | | Broadcast Program 14 | | Broadcast Program 15 | |
| | M18 Sports Ch | Broadcast Program 16 | | Broadcast Program 17 | | | |
| | 5/14 | Menu:0 | Previous Page:* | Next Page:# | Display Operation Mode:1 | 30 Minutes Remaining | 2/29 11:00 |

V13 · V12 · V11 · V14 · V15 · V16 · V17 · V18 · V19 · V20

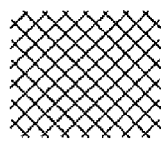
Recordable Time of Each Broadcast Program of Channels D1, D3 and D7 :
First Recordable Time (40 Minutes) > Second Recordable Time (30 Minutes) → Depends on Second Recordable Time

Recordable Time of Each Broadcast Program of Channels M12 and M18 :
First Recordable Time (45 Minutes) > Second Recordable Time (50 Minutes) → Depends on First Recordable Time

PROGRAM GUIDE DISPLAY APPARATUS

CROSS REFERENCE TO RELATED APPLICATION

This application claims priority to and the benefit of Japanese Patent Application No. 2008-219658 (filed on Aug. 28, 2008), the entire contents of which are incorporated herein by reference.

TECHNICAL FIELD

The present invention relates to program guide display apparatuses.

BACKGROUND ART

HDD (Hard Disk Drive) recorders, which are high capacity record media, have been put to practical use as recorders capable of recording television (hereinafter, referred to as TV) programs broadcasted. Having recording capacities from several hundred gigabytes to one terabyte, the HDD recorders can record the TV programs broadcasted for long hours. In addition, with its excellent random retrieval performance, the HDD recorders have started being used popularly at home.

When connected to networks, the HDD recorders can receive an electric program guide (EPG) and thereby, by using program information obtained from the electric program guide, can display broadcast stations, broadcast times, brief descriptions of contents of the TV programs and the like on a screen of TV set connected to the HDD recorder. A user can program a recording apparatus such as the HDD recorder or the like, which is built in the TV set or externally connected thereto, to video-record or sound-record a TV program by selecting it from the program guide displayed. Accordingly, the electric program guide allows for a simple operation to program recording of the TV program without complicated operations.

On the other hand, mobile devices such as mobile phones, PDAs, notebook computers, PHSs and the like having functions to receive broadcast programs and to record/play/view them have been suggested, including a mobile electronic apparatus having a function as a recorder (see Patent Document 1).

The recorder described in Patent Document 1 (hereinafter, referred to as a conventional art) is constituted as a broadcast program programming system having functions as follows:
(1) calculating a necessary recording capacity needed for each broadcast program to be broadcasted, by using an average recording bit rate of each recording mode and a broadcast time, and displaying recordability of each broadcast program determined based on a comparison of a remaining recording capacity of a recording unit and the above necessary recording capacity;
(2) calculating an unreserved remaining recording capacity by subtracting a reserved necessary recording capacity from the remaining recording capacity of the recording unit and determining recordability by comparing the unreserved recordable capacity and the necessary recording capacity of each broadcast program to be broadcasted;
(3) showing a recording mode of a best quality for each program to be broadcasted in the program guide if there are recording modes capable of recording as a result of determination on recordability, or displaying "unrecordable" for each broadcast program in the program guide if there is no recording mode capable of recording;
(4) displaying "unprogrammable" or "cannot record all" for each broadcast program in the program guide if a plurality of broadcast programs, up to a simultaneously recordable number, can be recorded but there is a broadcast program which cannot be programmed for recording in addition to broadcast programs already registered for recording which will be broadcasted at the same hour on the same broadcast date because of a limitation on the simultaneously recordable number; and
(5) displaying the result of the determination on recordability of each the broadcast program to be broadcasted in the program guide by color coding or by adding predetermined identifiers.

Patent Document 1 also describes about a remote control device, in the above manner, for determining recordability of the broadcast programs and for displaying the result of the determination on recordability in the program guide.

PRIOR ART DOCUMENT

Patent Document

Patent Document 1: Japanese Patent Laid-Open No. 2007-124534

SUMMARY OF INVENTION

Technical Problem

The above conventional art, in consideration of a remaining capacity of the recording unit, enables the user to know whether a specified broadcast program is viewable/recordable from beginning to end, upon seeing the program guide.

However, due to a large limitation on a battery capacity of the mobile terminal, it is necessary to consider the battery capacity required for viewing or recording when the broadcast program is viewed or recorded by the mobile terminal, otherwise viewing or recording of the broadcast program may be discontinued because of lack of a battery capacity during viewing or recording. Therefore, it is insufficient to consider only the recording capacity (memory capacity) when determining viewability or recordability of the broadcast program in displaying the program guide for viewing or recording the broadcast program with the mobile terminal, and it is necessary to consider the remaining battery level as well. However, since the above conventional art does not take the remaining battery level into account, the technique is not suitable for the program guide display when viewing or recording the broadcast program with the mobile terminal.

In addition, conventional program guides only show a broadcast program in a unit of viewing or recording.

A first object of the present invention is to provide a program guide display apparatus for discriminately displaying viewable zone in the program guide corresponding to a viewable time determined based on the remaining battery level, thereby improving convenience for the user.

A second object of the present invention is to provide a program guide display apparatus for discriminately displaying recordable zone in the program guide corresponding to a recordable time determined based on the remaining recording capacity, thereby improving convenience for the user.

Solution to Problem

In order to achieve the above first object, a program guide display apparatus according to claim 1 of the present invention includes: a reception unit for receiving a broadcast program by selecting a channel; an obtaining unit for obtaining a program guide of each channel received by the reception unit; a display unit for displaying the program guide obtained by the obtaining unit; a memory unit for storing setting information for viewing the broadcast program received by the reception unit; a remaining battery level detection unit for detecting a remaining battery level; and a control unit for determining a viewable time based on the setting information stored in the memory unit and the remaining battery level detected by the remaining battery level detection unit and for controlling the display unit to discriminately display a viewable zone corresponding to the viewable time in the program guide.

According to a preferred example of the above program guide display apparatus according to claim 1 of the present invention, the control unit controls the display unit to discriminately display the viewable zone using a current time as a reference, and also controls the display unit to discriminately display the viewable zone of each broadcast program using a program start time as a reference.

In order to achieve the above second object, a program guide display apparatus according to claim 4 of the present invention includes: a reception unit for receiving a broadcast program by selecting a channel; an obtaining unit for obtaining a program guide of each channel received by the reception unit; a display unit for displaying the program guide obtained by the obtaining unit; a recording unit for recording a broadcast program; a remaining recording capacity detection unit for detecting a remaining recording capacity of the recording unit; and a control unit for determining a recordable time based on the remaining recording capacity detected by the remaining recording capacity detection unit and for controlling the display unit to discriminately display a recordable zone corresponding to the recordable time in the program guide.

Preferred examples of the above program guide display apparatus according to claim 4 of the present invention are that the recording unit has a memory unit for storing a recording condition for recording a broadcast program, that the control unit determines the recordable time based on the recording condition stored in the memory unit and the remaining recording capacity detected by the remaining recording capacity detection unit, that the control unit controls the display unit to discriminately display the recordable zone using the current time as a reference, and that the control unit controls the display unit to discriminately display a viewable zone of each broadcast program using a program start time as a reference.

In order to achieve the above second object, a program guide display apparatus according to claim 8 of the present invention includes: a reception unit for receiving a broadcast program by selecting a channel; an obtaining unit for obtaining a program guide of each channel received by the reception unit; a display unit for displaying the program guide obtained by the obtaining unit; a memory unit for storing setting information for viewing the broadcast program received by the reception unit; a remaining battery level detection unit for detecting a remaining battery level; a recording unit for recording a broadcast program; a remaining recording capacity detection unit for detecting a remaining recording capacity of the recording unit; and a control unit for determining a first recordable time based on the setting information stored in the memory unit and the remaining battery level detected by the remaining battery level detection unit and a second recordable time based on the remaining recording capacity detected by the remaining recording capacity detection unit and for controlling the display unit to discriminately display a recordable zone corresponding to a recordable time in the program guide based on a shorter one between the first recordable time and the second recordable time.

Effect of the Invention

According to the present invention, the viewable zone corresponding to the viewable time determined based on the remaining battery level is discriminately shown in the program guide, and the recordable zone corresponding to the recordable time determined based on the remaining recording capacity is discriminately shown in the program guide. Thereby, it enables a user to know how long the broadcast programs are viewable/recordable upon viewing the program guide, thereby improving convenience for the user.

BRIEF DESCRIPTION OF DRAWINGS

FIG. 4 is a diagram illustrating an exemplary display 1 of the program guide by the mobile terminal according to the present invention;

FIG. 5 is a diagram illustrating an exemplary display 2 of the program guide by the mobile terminal according to the present invention;

FIG. 9 is a diagram illustrating an exemplary display 3 of the program guide by the mobile terminal according to the present invention;

FIG. 10 is a diagram illustrating an exemplary display 4 of the program guide by the mobile terminal according to the present invention; and FIG. 11 is a diagram illustrating an exemplary display 5 of the program guide by the mobile terminal according to the present invention.

DESCRIPTION OF EMBODIMENTS

Embodiments of the present invention will be described with reference to the accompanying drawings.

[Configuration of System]

Figure 1:
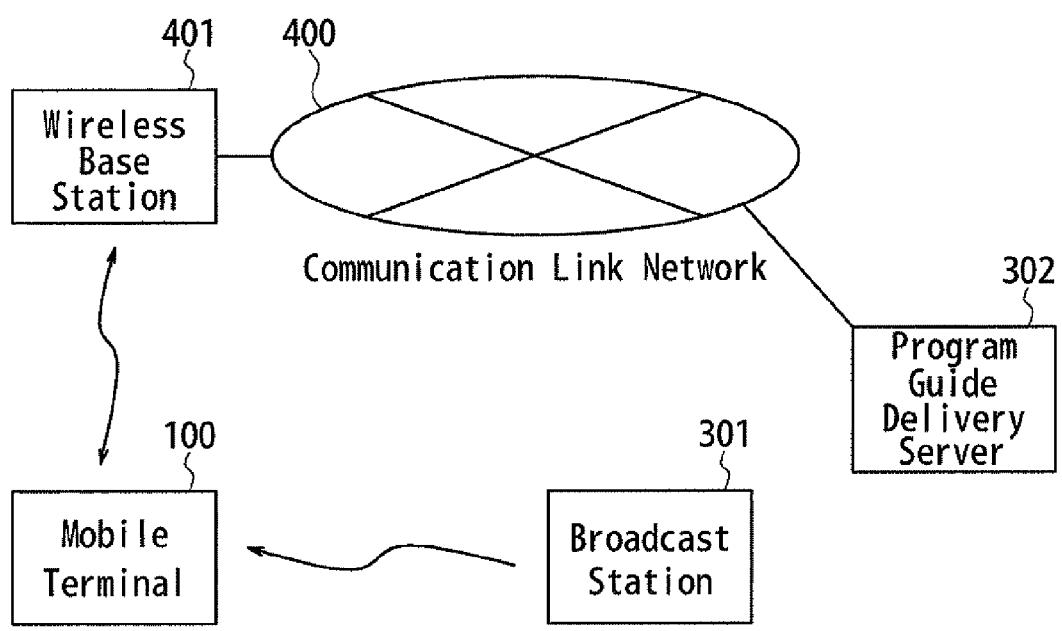
FIG. 1 is a diagram illustrating a configuration of an embodiment of a communication system including a program guide display apparatus according to the present invention.

FIG. 1 is a diagram illustrating a configuration of an embodiment of a communication system including a program guide display apparatus according to the present invention. As shown in FIG. 1, the communication system is constituted of a mobile terminal 100 as a representative example of the program guide display apparatus, a broadcast station 301, a communication link network 400, a wireless base station 401 and a program guide delivery server 302. The mobile terminal 100 can receive broadcast waves from the broadcast station 301 and also connect to the communication link network 400 through wireless transmissions and receptions with the wireless base station 401. The program guide delivery server 302 is connected to the communication link network 400, which allows the mobile terminal 100 to obtain an electric program guide (EPG) by connecting to the program guide delivery server 302. The mobile terminal 100 may also obtain the electric program guide (EPG) contained in broadcast waves by receiving the broadcast waves from the broadcast station 301.

It is to be noted that, since the present invention relates to the mobile terminal 100, descriptions of operations by the broadcast station 301, the program guide delivery server 302 and the wireless base station 401 are omitted.

[Configuration of Mobile Terminal]

Figure 2:
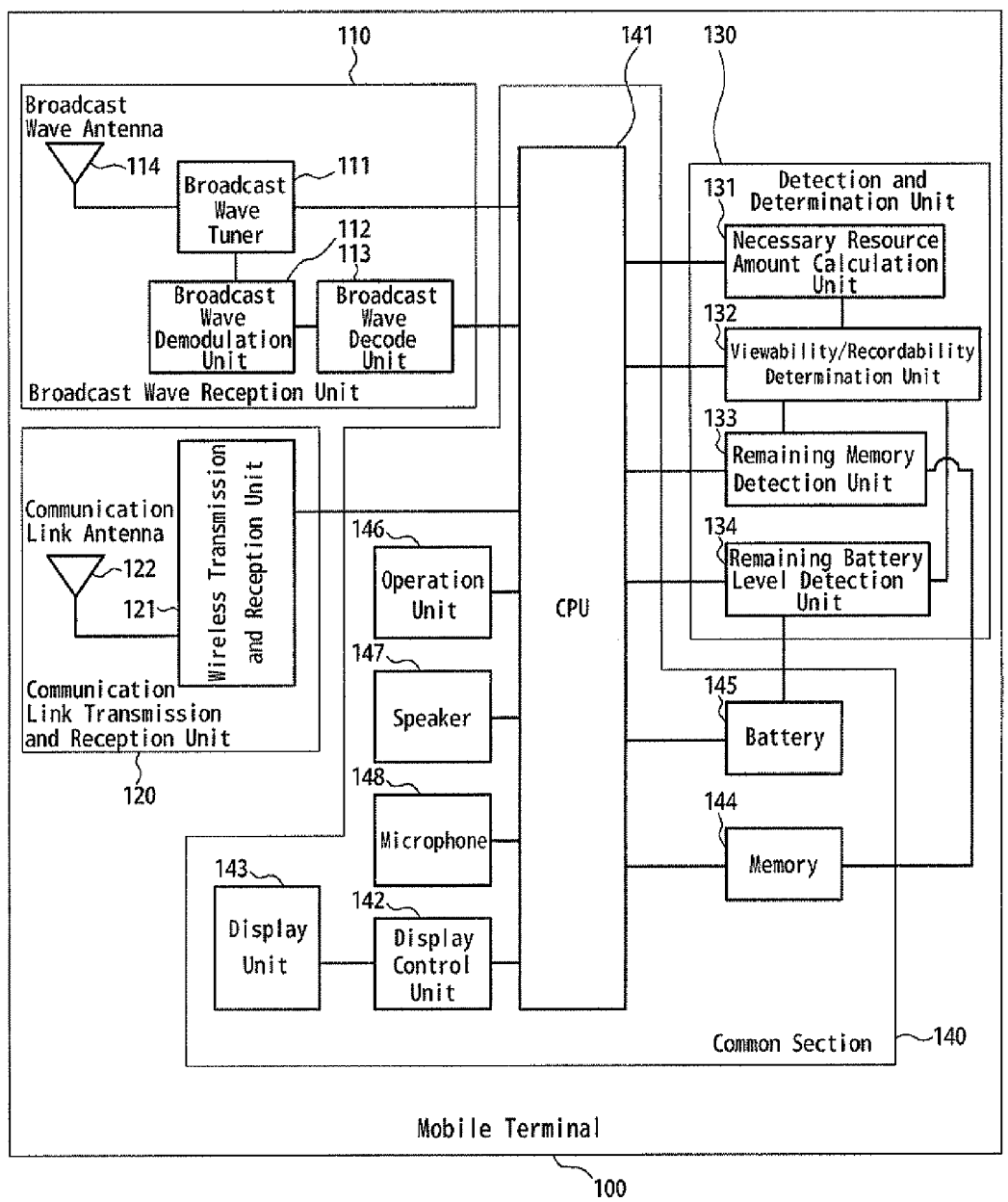
FIG. 2 is a block diagram illustrating a configuration of a mobile terminal as the program guide display apparatus according to the present invention.

FIG. 2 is a block diagram illustrating a configuration of a mobile terminal as a representative program guide display apparatus according to the present invention. The mobile terminal 100 of the present invention is a mobile (battery-powered) communication terminal apparatus having a function to receive broadcast waves of digital terrestrial broadcasting and the like and to view/record (video record)/play and a function to perform data communication with another communication apparatus (program guide delivery server 302 and the like) via the wireless base station 401 and the like. As shown in FIG. 2, the mobile terminal 100 includes a broadcast wave reception unit 110, a communication link transmission and reception unit 120, a detection and determination unit 130 and a common section 140. It is to be noted that, although both terms "record" and "video record" are used to describe the present invention, they have substantially the same meaning. In the following descriptions, accordingly, expressions such as "recording of a broadcast program" and "video recording of the broadcast program" have substantially the same meaning, and "recordable time" and "video recordable time" as well.

The broadcast wave reception unit 110 has a broadcast wave tuner 111, a broadcast wave demodulation unit 112, a broadcast wave decoder 113 and a broadcast wave antenna 114. The broadcast wave reception unit 110 serves as a reception unit for selecting a channel and receiving the broadcast program and, as well as an obtaining unit for obtaining the program guide of each channel that the reception unit receives.

The communication link transmission and reception unit 120 has a wireless transmission and reception unit 121 and a communication link antenna 122. The communication link transmission and reception unit 120 also serves as an obtaining unit for obtaining the program guide.

The detection and determination unit 130 has a necessary resource amount calculation unit 131, a viewability/recordability determination unit 132, a remaining memory detection unit 133 and a remaining battery level detection unit 134.

The common section 140 has a CPU 141, a display control unit 142, a display unit 143, a memory 144, a battery 145, an operation unit 146, a speaker 147 and a microphone 148. The display unit 143 displays the program guide obtained by the obtaining unit.

The broadcast wave tuner 111 selects one of the broadcast waves received by the broadcast wave antenna 114 and inputs selected broadcast wave to the broadcast wave demodulation unit 112. An activation command for the broadcast wave tuner 111 and channel selection information for selecting a desired broadcast wave (broadcast station) are provided from the CPU 141. It is to be noted that the broadcast wave tuner 111 includes a tuner for each channel of digital broadcasting and a tuner for each channel of MediaFLO broadcasting.

The broadcast wave demodulation unit 112 demodulates the broadcast wave provided from the broadcast wave tuner 111, extracts a bit stream and inputs it to the broadcast wave decoder 113.

The broadcast wave decoder 113 decodes the bit stream input by the broadcast wave demodulation unit 112 and inputs decoded bit stream to the CPU 141.

The wireless transmission and reception unit 121 controls wireless communication via the communication link antenna 122. For IPTV broadcasting and the like, the wireless transmission and reception unit 121 selects a channel and receives the broadcast program. Then, the wireless transmission and reception unit 121 decodes broadcast program data and inputs decoded broadcast program to the CPU 141.

The CPU 141 inputs the decoded broadcast program provided from the broadcast wave decoder 113 and the wireless transmission and reception unit 121 to the memory 144 (video memory and buffer memory) for viewing or stores in the memory 144 (video recording memory) for video recording. In addition, the CPU 141 generates electric program guide display information including viewable or video recordable broadcast time corresponding to a remaining recording capacity/battery level calculated by the viewability/recordability determination unit 132 and inputs the information to the display control unit 142. Moreover, if at least one of the remaining recording capacity and the remaining battery level does not satisfy a predetermined threshold (amount necessary for connecting to the program guide delivery server 302 and obtaining and storing the electric program guide), if it is not possible to connect to the program guide delivery server 302, or it is not possible to receive the broadcast waves, the CPU 141 generates display information to display accordingly and inputs the display information to the display control unit 142. If the program guide is already stored and can be displayed, it is not necessary to display the above state.

The CPU 141, together with the viewability/recordability determination unit 132, serves as a control unit for determining a viewable time based on setting information (operation mode information) stored in the memory 144 and the remaining battery level detected by the remaining battery level detection unit 134 and for controlling the display unit 143 to discriminately displays a viewable zone corresponding to the viewable time in the program guide. Additionally, the CPU 141, together with the viewability/recordability determination unit 132, serves as a control unit for determining a recordable time (video recordable time) based on the remaining recording capacity (remaining memory) detected by the remaining recording capacity detection unit (remaining memory detection unit) 133 and for controlling the display unit 143 to discriminately display a recordable zone (video recordable zone) corresponding to the recordable time (video recordable time) in the program guide. Moreover, the CPU 141, together with the viewability/recordability determination unit 132, serves as a control unit for determining a first recordable time based on the setting information (operation mode information) stored in the memory 144 and the remaining battery level detected by the remaining battery level detection unit 134, for determining a second recordable time based on the remaining recording capacity (remaining memory) detected by the remaining recording capacity detection unit (remaining memory detection unit) 133 and for controlling the display unit 143 to discriminately display the recordable zone (video recordable zone) corresponding to the recordable time (video recordable time) in the program guide based on a shorter one of the first recordable time and the second recordable time.

The display control unit 142 inputs decoded broadcast program data retrieved from the memory 144 via the CPU 141 to the display unit 143 to display the program guide on the display unit 143. In addition, the display control unit 142, based on display information (program guide display information) including the viewable/recordable time of the broadcast program input by the CPU 141, inputs data of the program guide showing the viewable/recordable zone (video recordable zone) based on the viewable/recordable time of each broadcast program to the display unit 143 to display the program guide in the display unit 143. Moreover, in a case such as that at least one of the remaining memory and the remaining battery level does not satisfy the above predetermined threshold, that it is not possible to connect to the program guide delivery server 302, and that it is not possible to receive broadcast waves, the display control unit 142 may receive display information accordingly from the CPU 141 to display the display information on the display unit 143. However, the above display information may not be displayed if the electric program guide is already stored and can be displayed.

The memory 144 serves as a memory unit for storing the setting information (operation mode information) for viewing the broadcast program received by the broadcast wave reception unit 110 and the wireless transmission and reception unit 121, as a recording unit for recording the broadcast program, and as the memory unit for storing a recording condition for recording the broadcast program by the recording unit.

The remaining memory detection unit 133 detects the remaining recording capacity of the memory 144 (remaining capacity calculated by subtracting a total capacity used for recording and secured for programmed recording from the entire capacity secured for recording in the memory unit 144). In FIG. 2, a single memory 144 is shown as a whole recording apparatus incorporated in and removably attached to the mobile terminal of the present invention. That is, the memory 144 is shown as representative of a video memory and a buffer memory for viewing, a working memory of the CPU 141, a recording memory, a memory card which is connected and disconnected by insertion and removal, and the like.

The remaining battery level detection unit 134 detects a residual amount (remaining battery level) of the battery 145 and continuously monitor the remaining battery level to input the remaining battery level as a result of detection to the viewability/recordability determination unit 132.

In the exemplary displays 1, 2 of the program guide described below, the necessary resource amount calculation unit 131, when triggered by an instruction to display the program guide, calculates the viewable time depending on the broadcast wave tuner 111 and the wireless transmission and reception unit 121 based on the setting information (operation mode information) and the remaining battery level and inputs calculated viewable time to the viewability/recordability determination unit 132. In addition, in the exemplary displays 3, 4 of the program guide described below, the necessary resource amount calculation unit 131, when triggered by the instruction to display the program guide, calculates the recordable time depending on the broadcast wave tuner 111 and the wireless transmission and reception unit 121 based on the recording condition (memory usage condition such as a bit rate, a frame rate and the like) and the remaining memory and inputs calculated recordable time to the viewability/recordability determination unit 132. Also, in the exemplary display 5 of the program guide described below, the necessary resource amount calculation unit 131, when triggered by the instruction to display the program guide, calculates the first recordable time depending on the broadcast wave tuner 111 and the wireless transmission and reception unit 121 based on the setting information (operation mode information) and the remaining battery level. Moreover, the necessary resource amount calculation unit 131, when triggered by the instruction to display the program guide, calculates the second recordable time depending on the broadcast wave tuner 111 and the wireless transmission and reception unit 121 based on the remaining memory and inputs the first recordable time and the second recordable time to the viewability/recordability determination unit 132.

In the exemplary display 1 of the program guide described below, the viewability/recordability determination unit 132 calculates the viewable time depending on the broadcast wave tuner 111 and the wireless transmission and reception unit 121 and, based on the viewable time, determines the viewable zone from a current time to the viewable time. Additionally, in the exemplary display 2 of the program guide described below, the viewability/recordability determination unit 132 calculates the viewable time depending on the broadcast wave tuner 111 and the wireless transmission and reception unit 121 and, based on the viewable time and information on (broadcast time of) the broadcast program shown in the program guide, determines the viewable zone from a start time of each broadcast program. Also, in the exemplary display 3 of the program guide described below, the viewability/recordability determination unit 132 calculates the recordable time depending on the remaining memory and a recording operation mode and, based on the recordable time, determines the recordable zone from the current time to a recordable time. Moreover, in the exemplary display 4 of the program guide described below, the viewability/recordability determination unit 132 calculates the recordable time depending on the remaining memory and the recording operation mode and, based on the recordable time and the information on (broadcast time of) the broadcast program shown in the program guide, determines the recordable zone from the start time of each broadcast program. Furthermore, in the exemplary display 5 of the program guide described below, the viewability/recordability determination unit 132 calculates the recordable time of the shorter one between the recordable time (first recordable time) depending on the broadcast wave tuner 111 and the wireless transmission and reception unit 121 and the recordable time (second recordable time) depending on the remaining memory and the recording operation mode. Then, the viewability/recordability determination unit 132 determines the recordable zone from the start time of each broadcast program based on the recordable time and the information on (broadcast time of) the broadcast program shown in the program guide.

Although each component of the detection and determination unit 130 and the display control unit 142 are provided independently from the CPU 141 in FIG. 2, they may be a part of the CPU 141 or a function of the CPU 141. In addition, although the broadcast wave reception unit 110 is configured to deal with one broadcast scheme in FIG. 2, it may also be configured to separately deal with a plurality of broadcast schemes (for example, ISDB-Tmm broadcasting and the MediaFLO broadcasting). Moreover, it is also possible in FIG. 2 that a single broadcast wave reception unit is configured to deal with a plurality of broadcast schemes (for example, digital terrestrial broadcasting and the MediaFLO broadcasting) or that a single broadcast wave antenna 114 is shared for a plurality of broadcast schemes.

[Operation to Display Program Guide by Mobile Terminal]

Figure 3:
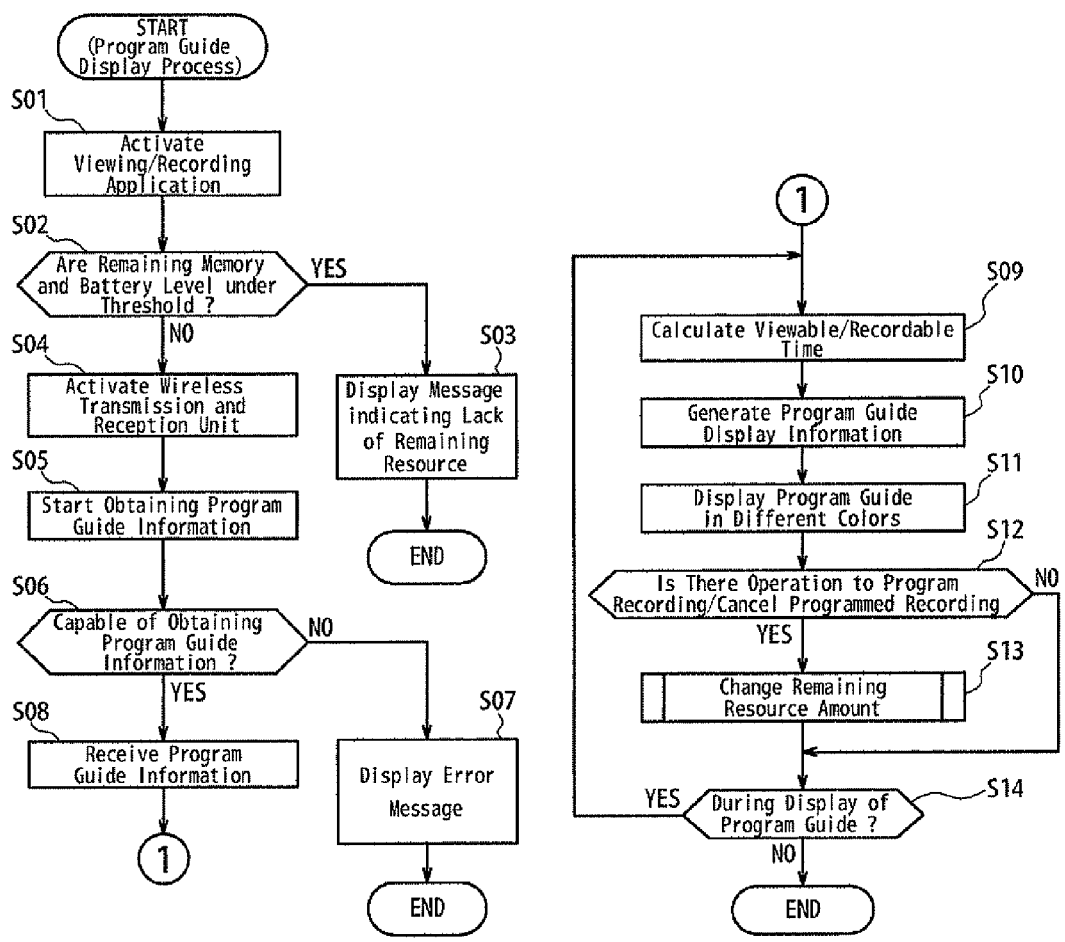
FIG. 3 is a flowchart illustrating operations to display the program guide by the mobile terminal according to the present invention.

FIG. 3 is a flowchart illustrating an operation to display the program guide by the mobile terminal according to the present invention. First, at step S01 an application (viewing/recording application) for viewing or recording a desired broadcast program is activated in response to a selection operation by a user. At a next step S02, the viewability/recordability determination unit 132 determines whether the remaining memory (remaining recording capacity: the remaining amount calculated by subtracting the capacity already used for recording and the capacity necessary for recording of a programmed broadcast program from an entire memory secured for recording) and the remaining battery level detected by the remaining battery level detection unit 134 satisfy the predetermined threshold (battery level necessary for connecting the program guide delivery server 302, performing reception processing of broadcast and obtaining and storing the program guide) and inputs a result of determination to the CPU 141.

If a result of the determination at step S02 is YES (at least one of the remaining memory and the remaining battery level is under the predetermined threshold), the operation proceeds to step S03, where the CPU 141 inputs display information of a message indicating lack of remaining resource (for example, a message that the electric program guide cannot be obtained or stored because of lack of the remaining memory or the remaining battery level) to the display control unit 142 to display the message indicating lack of the remaining resource on the display unit 143. In contrast, if the result of the determination at step S02 is NO (the remaining memory and the remaining battery level are equal to or over the predetermined threshold), the operation proceeds to step S04, where the CPU 141 initiates the wireless transmission and reception unit 121. At a next step S05, the CPU 141 controls the wireless transmission and reception unit 121 to start obtaining program guide information (electric program guide information) from the program guide delivery server 302. It is not necessary for the CPU 141 to initiate the wireless transmission and reception unit 121 when starting obtaining the program guide information from the broadcast waves.

At a next step S06, the CPU 141 monitors whether a response from the program guide delivery server 302 can be obtained within a predetermined time and thereby determines whether the program guide information can be obtained from the program guide delivery server 302. If it is NO as a result of this determination, the operation proceeds to step S07, where the CPU 141 inputs an error message (for example, a message that it is not possible to connect to the program guide delivery server 302) to the display control unit 142 in order to display the error message on the display unit 143. In contrast, if it is YES as the result of the determination at step S06, the operation proceeds to step S08, where the CPU 141 controls the wireless transmission and reception unit 121 to receive the program guide information from the program guide delivery server 302. At this time, if the program guide information is already stored in the memory 144, the program guide information obtained is stored overwriting the one in the memory. It is also possible to replace processing at step S06 with processing to receive the program guide information from the broadcast waves.

At a next step S09, the CPU 141 controls the viewability/recordability determination unit 132 to calculate the viewable/recordable time with respect to each broadcast program described in the program guide information received, based on a combination (setting information for viewing; operation mode information) of a memory usage condition including the broadcast time and at least one of a bit rate and a frame rate and a battery usage condition including display brightness of the display unit 143 and presence or absence of a regulation of incoming call and answer (regulation to receive the incoming call but not to answer) and a regulation of transmission (regulation not to transmit a call, data communication and the like), and on a current remaining memory and a current remaining battery level. In particular, the necessary resource amount calculation unit 131 inputs the necessary resource amount for the above operation mode to the viewability/recordability determination unit 132, and the remaining memory detection unit 133 and the remaining battery level detection unit 134 detect the remaining memory and the remaining battery level, respectively, and input them to the viewability/recordability determination unit 132. The viewability/recordability determination unit 132 compares a detected remaining resource amount constituted of the remaining memory and the remaining battery level detected by the remaining memory detection unit 133 and the remaining battery level detection unit 134, respectively, and the necessary resource amount provided from the necessary resource amount calculation unit 131. (1) In the exemplary displays 1, 2 of the program guide described below, the viewability/recordability determination unit 132 calculates the viewable time for each broadcast system of the broadcast program and for each operation mode of the terminal based on the remaining battery level constituting the detected remaining resource amount and inputs the viewable time as a result of calculation to the CPU 141. (2) In the exemplary displays 3, 4 of the program guide described below, the viewability/recordability determination unit 132 calculates the recordable time for each broadcast system of the broadcast program and for each operation mode of the terminal based on the remaining memory constituting the detected remaining resource amount and inputs the recordable time as a result of calculation to the CPU 141. (3) In the exemplary display 5 of the program guide described below, the viewability/recordability determination unit 132 calculates the recordable time for each broadcast system of the broadcast program and for each operation mode of the terminal based on one of the remaining memory and the remaining battery level, constituting the detected remaining resource amount, which has a smaller ratio to the necessary amount and inputs the recordable time as a result of calculation to the CPU 141.

As the above operation mode, there are operation modes 1-6 as the following, for each of which contents of control are set.

(Operation Mode 1) High bit rate, high display brightness, no regulation of incoming call and answer, and no regulation of transmission. In this case, memory usage and battery usage are not controlled.

(Operation Mode 2) High bit rate, low display brightness, no regulation of incoming call and answer, and no regulation of transmission. In this case, battery usage is slightly controlled.

(Operation Mode 3) High bit rate, low display brightness, no regulation of incoming call and answer, and regulation of transmission. In this case, battery usage is moderately controlled.

(Operation Mode 4) High bit rate, low display brightness, regulation of incoming call and answer, and regulation of transmission. In this case, batter usage is strictly controlled.

(Operation Mode 5) Low bit rate, high display brightness, no regulation of incoming call and answer, and no regulation of transmission. In this case, memory usage is controlled.

(Operation Mode 6) Low bit rate, low display brightness, regulation of incoming call and answer, and regulation of transmission. In this case, memory usage and battery usage are strictly controlled.

At a next step S10, program guide display information including viewable/recordable time of each broadcast program is generated. The program guide display information is generated by the CPU 141 provided with the viewable/recordable time from the viewability/recordability determination unit 132 and input to the display control unit 142. At a next step S11, the program guide showing the viewable/recordable zone corresponding to the viewable/recordable time of each broadcast program color coded based on the program guide display information provided from the CPU 141 is displayed on the display unit 143.

At a next step S12, the CPU 141 determines whether there is an operation to program recording or an operation to cancel a programmed recording. Here, if there is the operation to program recording or the operation to cancel the programmed recording (YES of step S12), the operation proceeds to step S13, while skipping step S13 if there is neither operation to program recording nor operation to cancel the programmed recording (NO of step S12). If it is selected to program recording at step S12, the CPU 141 inputs a memory capacity and a battery level necessary for recording of the broadcast program calculated by the necessary resource amount calculation unit 131 to the remaining memory detection unit 133 and the remaining battery level detection unit 134. If it is selected to cancel programmed recording at step S12, the CPU 141 retrieves the memory capacity and the battery level necessary for recording of the broadcast program, stored in the memory 144 when the recording is programmed, and inputs them to the remaining memory detection unit 133 and the remaining battery level detection unit 134. If it is selected to program recording, the remaining memory detection unit 133 and the remaining battery level detection unit 134 obtain a value calculated by subtracting the memory capacity necessary for recording from the remaining memory and a value calculated by subtracting the battery level necessary for recording from the remaining battery level, respectively. If it is selected to cancel the existing programmed recording, the remaining memory detection unit 133 and the remaining battery level detection unit 134 obtain a value calculated by adding the memory capacity which was necessary for this recording to the remaining memory and a value calculated by adding the battery level which was necessary for this recording to the remaining battery level, respectively. At step S13, processing of recording program shown in FIG. 7 described below is executed, and thereby the remaining resource amount is changed (secured/released). At a next step S14, whether the program guide is being displayed is determined. If the program guide is being displayed, the operation returns to step S09 to repeat a loop of step S09-step S10-step S11-step S12-step S13-step S14. If display of the program guide is finished, the operation ends as it stands. Since the above loop from step S09 to step S14 is repeated until display of the program guide is finished, the operations after step S09 are re-performed, if there is the operation to program recording or the operation to cancel the existing programmed recording, based on the remaining resource amount (remaining memory and battery level) changed at step S13.

[Exemplary Display 1 of Program Guide]

FIG. 4 is a diagram illustrating an exemplary display 1 of the program guide by the mobile terminal according to the present invention. In the exemplary display 1, the viewable time of each broadcast program and the viewable zone corresponding to the viewable time from the current time (17:12 in this example), which is determined based on the remaining battery level, is displayed for each tuner (for each broadcast system). It is also possible to display only the viewable time and the viewable zone related to an activated tuner. In the exemplary display 1, the viewable time of each broadcast program is 60 minutes for channels M12, M18 of MediaFLO broadcasting and 48 minutes for channels D1, D3 and D7 of the digital broadcasting and zones thereof are shown. Each column of the program guide shown in FIG. 4 is described below. It is assumed that reception of MediaFLO broadcasting consumes less power than reception of the digital broadcasting.

A display column V11 shows a channel number and the broadcast station or a broadcast channel name of each broadcast program.

A display column V12 shows hours.

A display column V13 shows the broadcast date (February 29, in the example shown in the figure) of the broadcast programs displayed.

A display column V14 shows a page number of a plurality of pages constituting the program guide. In the example shown in the figure, "5/14" represents "5th page of 14 pages".

A display column V15 shows a key used to display a menu screen. In the example shown in the figure, "Menu:0" represents that the menu screen is displayed if a key of "0" is pressed down. In addition, an operation for changing display contents of the program guide to contents according to another operation mode can be performed by selecting the menu in the display column V15 and then selecting a displayed operation mode switching function in the menu.

Display columns V16, V17 show a key used to display a previous page of a current page being displayed and a key used to display a following page, respectively, among the plurality of pages constituting the program guide. In the example shown in the figure, "Previous Page:*" represents that a 4th page is displayed if a key of "*" is pressed down (a 5th page is currently displayed), whereas "Next Page:#" in the display column V17 represents that a 6th page is displayed if a key of "#" is pressed down.

A display column V18 shows an operation mode corresponding to the viewable time being displayed. In the example shown in the figure, "Display Operation Mode: 1" represents that the viewable time being displayed corresponds to the operation mode 1.

A display column V19 shows the viewable time in the operation mode being displayed and also shows which of the remaining memory and the remaining battery level determines the viewable time. In the example shown in the figure, "Remaining: 60 Minutes" represents that the viewable time of the channel (for example, the channel M12) selected in the operation mode displayed is 60 minutes. Additionally, the diagonal lines in the display column V19 indicate that a remaining time (60 minutes) is determined based on the remaining battery level.

A display column V20 shows a current date. In the example shown in the figure, "2/29 17:12" represents that it is "17:12 on February 29th" now In the program guide shown in FIG. 4, the viewable time of each broadcast program is (discriminately) shown as the viewable zone corresponding to a length of the viewable time by the diagonal lines as shown on Program 1, Program 6, Program 9 and so on. Since a remaining broadcast time (48 minutes) of the Program 1 is equal to the viewable time thereof (48 minutes), the diagonal lines are provided in an entire area of the Program 1. Since the viewable time (48 minutes) of the Program 6 is shorter than the remaining broadcast time thereof (108 minutes), the diagonal lines are provided in an area corresponding to the viewable time (48 minutes) from the current time (17:12) as a reference. In addition, since the viewable time (60 minutes) of a Program 13 is shorter than the remaining broadcast time thereof (108 minutes), the diagonal lines are provided in an area corresponding to the viewable time (60 minutes) from the current time (17:12) as a reference.

[Exemplary Display 2 of Program Guide]

FIG. 5 is a diagram illustrating an exemplary display 2 of the program guide by the mobile terminal according to the present invention. In the exemplary display 2, the viewable time of each broadcast program and the viewable zone corresponding to the viewable time, which are determined based on the remaining battery level, are displayed for each tuner (broadcast system) and for each broadcast program. It is also possible to display only the viewable time and the viewable zone related to the tuner activated. In the exemplary display 2, the viewable time of each broadcast program is 75 minutes for the channels M12, M18 of the MediaFLO broadcasting and 60 minutes for the channels D1, D3 and D7 of the digital broadcasting, and the viewable zones thereof are shown based on the current time and the start times of the broadcast programs. Each column in the program guide of FIG. 5 is the same as that in FIG. 4, hence description thereof is omitted. A difference in power consumption between the broadcast systems is the same as that in FIG. 4.

In the program guide shown in FIG. 5, the viewable time of each broadcast program, is (discriminately) shown as the viewable zone corresponding to a length of the viewable time by the diagonal lines in Program 1, Program 2, . . . , Program 6, Program 7, . . . , Program 13, Program 14, and so on. Since the broadcast time (60 minutes) of the Program 1 and the Program 3 is equal to the viewable time thereof (60 minutes), the diagonal lines are provided in entire areas from the broadcast start time (Program 1; 17:00, Program 3; 20:00) as a reference. Since the viewable time (60 minutes) is shorter than the broadcast time (120 minutes) of the Program 2 and the Program 6, the diagonal lines are provided in areas corresponding to the viewable times (60 minutes) from the broadcast start time (Program 2; 18:00, Program 6; 17:00) as a reference. In addition, since the viewable time (75 minutes) is shorter than the broadcast time (120 minutes) of the Program 13 and the Program 14, the diagonal lines are provided in an areas corresponding to the viewable times (75 minutes) from the broadcast start time (17:00) as a reference.

[Operation in Case Having Incoming Call During Display of Program Guide]

Figure 6:
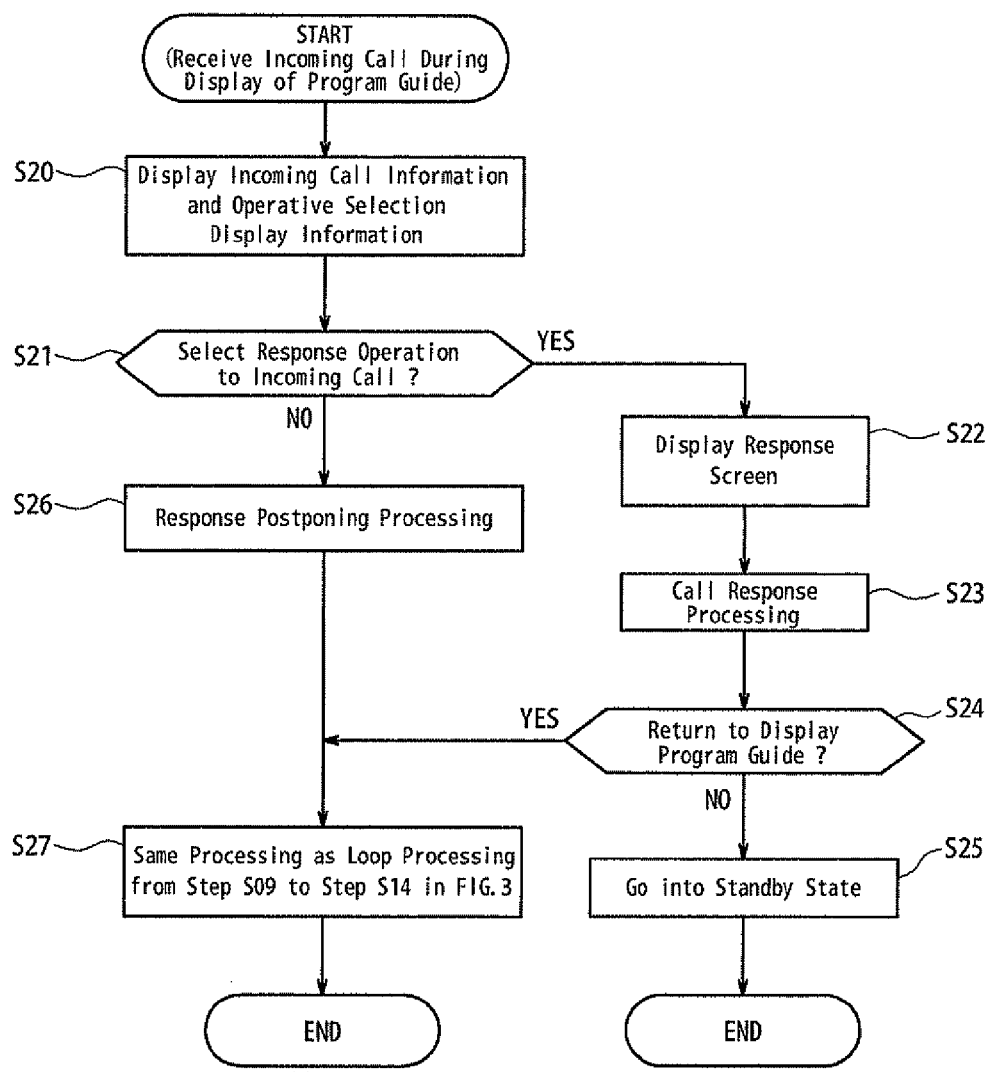
FIG. 6 is a flowchart illustrating operations performed when there is an incoming call during display of the program guide by the mobile terminal according to the present invention.

FIG. 6 is a flowchart illustrating operations when there is an incoming call during display of the program guide by the mobile terminal according to the present invention.

If the communication link transmission and reception unit 120 receives a call during display of the program guide, the CPU 141, at step S20, generates incoming call information for displaying a type of the incoming call (a message, a voice call, download of information, other notifications of information using a communication link) and a sender and inputs the information to the display control unit 142, as well as generating an operative selection display information to ask a user to select whether to perform a response operation to the incoming call or to postpone the response operation and continue displaying the program guide and inputting the information to the display control unit 142. The display control unit 142 displays the incoming call information and the operative selection display information that are inputted thereto on the display unit 143. At a next step S21, it is determined whether the response operation is selected by the user. Here, if "recording is programmed with the regulation of incoming call and answer not to perform the response operation to the incoming call" in advance, it is displayed accordingly. If it is selected to perform the response operation at step S21, it proceeds to step S22, whereas it proceeds to step S26 if it is selected not to perform the response operation soon (to postpone the response operation).

At step S22, the CPU 141 generates display information for displaying an incoming call response screen according to the type of the incoming call and displays the display information on the display unit 143 via the display control unit 142. The response screen is a screen, if the type of the incoming call is the voice call, for displaying a caller's name and reception of the call on the display unit 143 to ask the user to perform a call starting operation. At a next step S23, the user performs the response operation on the incoming call response screen displayed on the display unit 143. The response operation is an operation, if the incoming call is the voice call, to start the voice call by pressing an off-hook button and to end the voice call by pressing an on-hook button. At a next step S24, when detecting end of processing for incoming call response, the CPU 141 generates display information for displaying a selection screen to ask the user to select whether to display (return to) the program guide again or to enter a standby state without displaying the program guide and displays the display information on the display unit 143 via the display control unit 142. Here, the operation proceeds to step S27 if it is selected to display the program guide again, whereas it proceeds to step S25 if it is selected to enter the standby state without displaying the program guide. At step S25, the CPU 141 displays a standby state screen on the display unit 143 via the display control unit 142 and enters into the standby state.

The operation proceeds, if it is NO at step S21, to step S26 where the CPU 141 performs a response postponing operation. The response postponing operation is an operation to generate incoming call history according to the type of the incoming call and stores it in the memory 144, in order to prevent thereafter from notification of incoming call by display, sound, vibration or the like until display of the program guide is finished. For example, if the incoming call is the voice call and the user has set response by an answering machine in advance, answering machine response information and call history information are generated according to such setting. If response by the answering machine is not set, missed call history information is generated. Each information generated is stored in the memory 144. Thereafter, the notification of the incoming call by display, sound or vibration is refrained until display of the program guide is finished. Although it is not shown in the figure, when display of the program guide is finished, the CPU 141 retrieves the call history information stored in the memory 144 and displays the call history information on the display unit 143 via the display control unit 142. At a next step S27, the same processing (including discriminate display of the program guide by color coding) as the loop processing from step S09 to step S14 in FIG. 3 is performed. The processing at step S27 ends when display of the program guide is finished by a use's operation.

[Operation of Programming]

Figure 7:
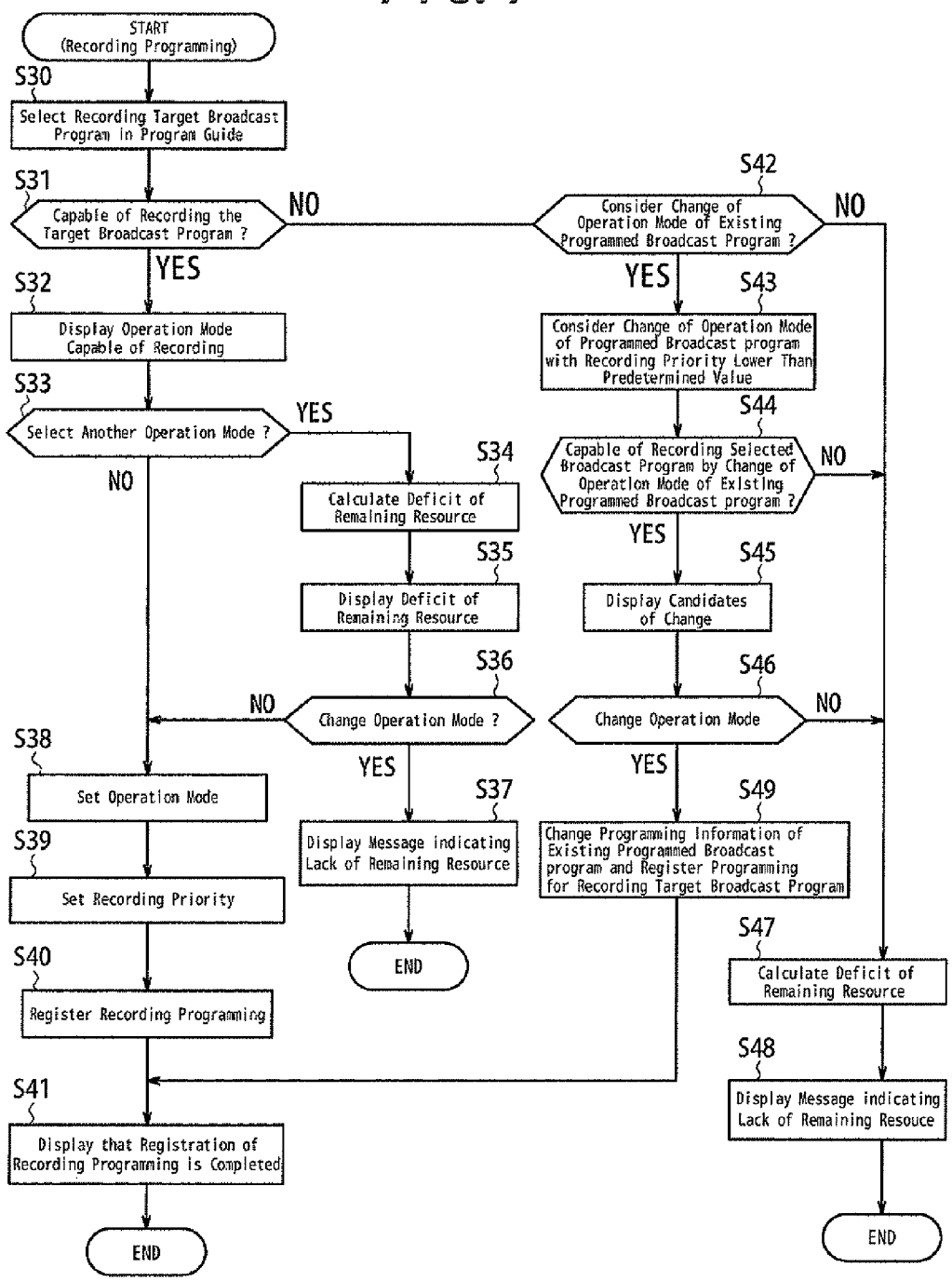
FIG. 7 is a flowchart illustrating operations when programming the recording by the mobile terminal according to the present invention.

FIG. 7 is a flowchart illustrating operations to program the mobile terminal according to the present invention. First, if a recording target program (broadcast program desired for recording) in the program guide displayed is selected by the user at step S30, the CPU 141, at a next step S31, determines whether the recording target program selected by the user can be recorded in any operation mode, by using the remaining memory (the memory capacity calculated by subtracting the capacity already used for recording and a capacity necessary for recording a programmed broadcast program from the entire memory secured for storing user data) and the remaining battery level determined by the viewability/recordability determination unit 132 when displaying the program guide. If it can be recorded, the operation proceeds to step S32, whereas the operation proceeds to step S42 if it cannot be recorded. It is to be noted that the operation mode is a combination of the memory usage condition such as the bit rate, the frame rate and the like for viewing/recording and the battery usage condition such as the display brightness of the display unit 143 and the like (setting information for viewing/recording).

At step S32, an operation mode capable of executing recording of the recording target program selected is displayed on the display unit 143 for user's confirmation. At a next step S33, it is determined whether recording in the operation mode capable of executing recording displayed or recording in another mode is selected by the user. If recording in another operation mode is selected, the operation proceeds to step S34, whereas the operation proceeds to step S38 if recording in the operation mode capable of executing recording displayed is selected. At step S34, the viewability/recordability determination unit 132 calculates deficits (deficits of remaining resources; a deficit of the memory and a deficit of the battery level) of the current memory and the current battery level necessary for recording of the recording target program and inputs them to the CPU 141. At a next step S35, the CPU 141, based on a deficit (time) input from the viewability/recordability determination unit 132, generates display information on the deficits of the memory and of the battery necessary for recording of the recording target program for each of the operation modes and displays them on the display unit 143 via the display control unit 142. At a next step S36, it is determined whether the user has changed the operation mode based on the deficits of the memory and of the battery level necessary for recording of the recording target program in the operation mode displayed. If the operation mode is changed, the operation proceeds to a step S37, whereas the operation proceeds to a step S38 if the operation mode is not changed. At a step S37, the CPU 141 displays the deficits of the memory and of the battery level necessary for recording of the recording target program in the operation mode after change by the user and a message of the deficit of the remaining resource (message indicating lack of at least one of the memory and the battery level for execution of recording) on the display unit 143 via the display control unit 142.

After the user selects the operation mode capable of recording displayed at step S32, the operation proceeds from NO of step S33 and NO of step S36 to step S38 to ask the user to select an operation mode among the operation modes capable of recording to execute the recording and sets the operation mode selected. At a next step S39, a recording priority of the recording target program is set by the user. The recording priority is set by numbers such as 1, 2, 3, and so on, for example, and the priority is higher in ascending order of the numbers. It is to be noted that the priority can be changed later. At a next step S40, recording programming for the target program is registered by the user. At this time, the CPU 141 stores the operation mode, the recording priority and programming registration information (the broadcast start time, a broadcast end time, a program name, a broadcast channel and other information necessary for recording) of the recording target program and the memory capacity and the battery level necessary for recording in the operation mode set in the memory 144. In addition, the CPU 141 secures the memory capacity necessary for recording in the operation mode set, as well as subtracting such secured memory capacity from the remaining memory, such that the memory capacity secured is not used for recording and data storing of other broadcast programs until the recording target program registered for recording is cancelled. Moreover, the CPU 141 inputs the memory capacity secured in the remaining memory detection unit 133. The remaining memory detection unit 133 adds the memory capacity input to the entire memory secured for recording before programming the recording and uses it for detecting the remaining memory. It is to be noted that the remaining memory detection unit 133, by securing not only the memory capacity but also the battery level necessary for recording in the operation mode set, may prevent the secured battery level from being used for recording of other broadcast programs or other operations of the mobile terminal 100 until the programming for the recording target program is cancelled. At a next step S41, the CPU 141 displays that registration of the recording programming is completed on the display unit 143 via the display control unit 142.

At step S42, to where the operation proceeds from step S31 if the recording target program cannot be recorded in the operation mode displaying the program guide, the user selects whether to consider changing the operation mode of the existing programmed broadcast program. The operation proceeds to step S43 in order to check if change of the operation mode enables recording of the target program, whereas the operation proceeds to step S47 if change of the operation mode is not considered. At step S43, it is considered to change the operation mode for recording a broadcast program programmed with the recording priority less than a predetermined value. In particular, the CPU 141 retrieves the recording priority of the existing programmed broadcast program stored in the memory 144 and inputs the broadcast time of the programmed broadcast program, among the existing programmed broadcast programs, having the recording priority less than the predetermined value to the necessary resource amount calculation unit 131. The necessary resource amount calculation unit 131 calculates the memory capacity and the battery level necessary for recording the programmed broadcast program in each operation mode. Also, the CPU 141 inputs the broadcast time of the recording target program selected at step S30 to the necessary resource amount calculation unit 131, upon which the necessary resource amount calculation unit 131 calculates the memory capacity and the battery level necessary for recording of the programmed broadcast program in each operation mode. It is to be noted that the predetermined value of the recording priority is set by the user in advance, or a default value (for example, priority 2) is used if not set by the user. The necessary resource amount calculation unit 131 inputs the memory capacity and the battery level as results of calculation to the viewability/recordability determination unit 132, upon which the viewability/recordability 132, based on the remaining memory and the remaining battery level input, the remaining memory and the remaining battery level detected by the remaining memory detection unit 133 and the remaining battery level detection unit 134, respectively, obtains a combination of an operation mode of (one or more of) the existing programmed broadcast program and the operation mode capable of recording of the recording target program and inputs the combination to the CPU 141.

At a next step S44, the CPU 141 determines whether the recording target program selected at step S30 can be recorded by change of the operation mode of the existing programmed broadcast program. If there are combinations of operation mode capable of recording the existing programmed broadcast program and the recording target program selected at step S30, the operation proceeds to step S45, whereas the operation proceeds to step S47 if there is no combination. At step S45, the CPU 141 generates display information of the combinations (candidate for change) of the operation modes capable of recording the existing programmed broadcast program and the recording target program selected at step S30 and displays the candidates for change on the display unit 143 via the display control unit 142. At a next step S46, it is selected by the user whether to change the operation mode. If the operation mode is changed, in other words, if recording the existing programmed broadcast program and the recording target program selected at step S30 in any operation mode among the candidates for change displayed at step S45, the operation proceeds to step S49, whereas the operation proceeds to step S47 if the operation mode is not changed.

At step S49, programming information of the existing programmed broadcast program is changed and the programming for the recording target program selected is registered. In particular, the operation modes, selected by the user at step S46, for the existing programmed broadcast program and for the recording target program selected at step S30, the memory capacities and the battery levels necessary for recording in these operation modes and other recording programming information are registered. After step S49, the operation proceeds to step S41 to display that it is completed to register the programming. At step S47, on the other hand, the deficits of the remaining resources (the deficit of the memory and the deficit of the battery level) are calculated. In particular, the viewability/recordability determination unit 132 calculates the deficits of the current memory and of the current battery level to the memory capacity and the battery level necessary for recording of the recording target program selected at step S30, calculated by the necessary resource amount calculation unit 131 when displaying the program guide, for the operation mode displayed and for an operation mode requiring the least memory capacity and battery level. Then, the viewability/recordability determination unit 132 inputs the deficits of the memory and of the battery level calculated to the CPU 141. At a next step S48, the message indicating lack of the remaining resource is displayed. In particular, the CPU 141, based on the deficits of the memory and of the battery level input by the viewability/recordability determination unit 132, generates display information (including, for example, the program name, the recordable time, the operation mode, and the deficits of the battery level and of the memory) to be displayed (by a pop-up box, for example) in relation to a broadcast program indicated by a cursor and the like and displays the message indicating lack of the remaining resource on the display unit 143 via the display control unit 142, as shown in the exemplary display 4 of the program guide in FIG. 10 described below.

It is to be noted that "recording" can be replaced with "viewing" in processing from step S30 to step S48 in the flowchart shown in FIG. 7, in order to adopt the flowchart to "program viewing". In this case, after registering a viewing programming at step S40, the CPU 141, based on the operation mode of the viewing programming registered, displays broadcast data input from the broadcast wave reception unit 110 and the wireless transmission and reception unit 121 on the display unit 143 via the display control unit 142.

[Monitoring of Remaining Resource Amount after Registration of Recording Programming]

Figure 8:
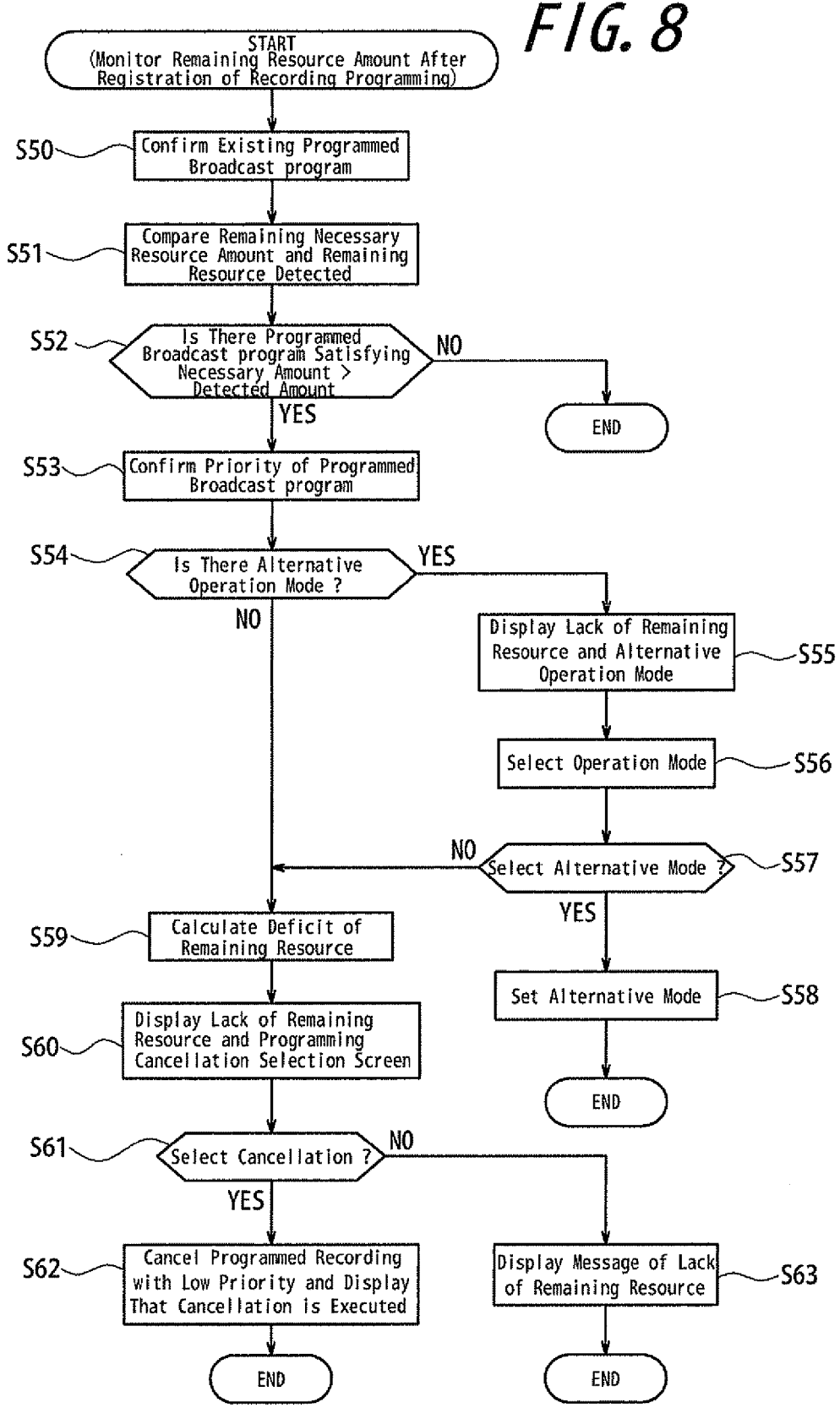
FIG. 8 is a flowchart illustrating operations to monitor a remaining resource amount after programming the recording by the mobile terminal according to the present invention.

FIG. 8 is a flowchart illustrating an operation to monitor the remaining resource amount after registration of the recording programming by the mobile terminal according to the present invention. Monitoring of the remaining resource amount after registration of the recording programming is performed continuously.

At step S50, first, the existing programmed broadcast program is confirmed. In particular, the CPU 141 retrieves register information of the existing programmed broadcast program stored in the memory 144 and the memory capacity and the battery level necessary for recording corresponding to the register information and inputs them to the necessary resource amount calculation unit 131. At a next step S51, the remaining memory detection unit 133 and the remaining battery level detection unit 134 detect the remaining memory (the memory capacity calculated by subtracting the memory capacity already used for recording and the memory capacity necessary for recording of the existing programmed broadcast program from the entire memory capacity secured for recording) and the remaining battery level, respectively, and input them to the viewability/recordability determination unit 132. The necessary resource amount calculation unit 131 calculates the memory capacity and the battery level necessary for recording all of the existing programmed broadcast programs and inputs them to the viewability/recordability determination unit 132. The viewability/recordability determination unit 132 compares the memory capacity and the battery level necessary for recording of all of the existing programmed broadcast programs with the remaining memory and the remaining battery level and inputs a result of comparison to the CPU 141. If the remaining memory and the remaining battery level is less than the memory capacity and the battery level necessary for the above recording, the viewability/recordability determination unit 132 detects an operation mode capable of recording with the current memory and the current battery level with respect to each of the programmed broadcast programs and inputs presence or absence of such operation mode and information on the operation mode.

At a next step S52, it is determined whether there is a programmed broadcast program with detected amounts (the remaining memory and the remaining battery level) less than necessary amounts (the memory capacity and the battery level necessary for recording). If there is an applicable programmed broadcast program, the operation proceeds to step S53, whereas the operation ends as it stands if there is no applicable programmed broadcast program. At step S53, the CPU 141 retrieves the recording priority of the programmed broadcast program with memory capacity and battery level less than those necessary for recording and confirms it. At a next step S54, it is determined whether there is a capable operation mode with the current memory and the current battery level. If there is such an operation mode, the operation proceeds to step S55, whereas the operation proceeds to step S59 if there is no such operation mode.

At step S55, it is displayed that the remaining resource is insufficient and an alternative operation mode. In particular, the CPU 141 generates alternative operation mode information including the fact that at least one of the memory and the battery level is insufficient, the information (the program name and the broadcast time) on the recording programmed broadcast program which cannot be recorded in the operation mode set at programming of recording because of lack of at least one of the memory and the battery level, the operation mode capable of recording the programmed broadcast program with the current memory and the current battery level, and the operation mode set at programming of recording. Then, the CPU 141 displays that at least one of the memory and the battery level is insufficient and the alternative operation mode on the display unit 143 via the display control unit 142. At this time, combinations of information on the programmed broadcast program and the corresponding operation mode are arranged horizontally or vertically. The combinations are displayed such that, based on the recording priority retrieved at step S53, the priority descends from the left to the right if the combinations are arranged horizontally, or from the top to the bottom if the combinations are arranged vertically. Among combinations with the same priority, the combination with earlier broadcast start time comes first. In addition, the operation mode in each combination is arranged from the left to the right for each combination arranged horizontally and from the top to the bottom for each combination arranged vertically, for allowing selection between the operation mode capable of recording the programmed broadcast program with the current memory and the current battery level and the operation mode set at programming of recording. Moreover, each time the operation mode being selected, an operation mode selectable for a next combination with the operation mode being selected is recalculated and displayed.

At a next step S56, the operation mode is selected by the user. The user selects any operation mode from each programmed broadcast program displaying the operation mode (alternative operation mode; any one if there are more than one) capable of recording with the current memory and the current battery level or the operation mode set at programming of recording, from the left to the right if arranged horizontally or from the top to the bottom if arranged vertically. At a next step S57, it is determined whether the alternative operation mode is selected. At this determination, the operation proceeds to step S58 if the alternative operation mode (operation mode capable of recording any of the programmed broadcast programs with the current memory and the current battery level) is selected at step S56, whereas the operation proceeds to step S59 if the operation modes set at programming of recording is selected for all of the programmed broadcast programs at step S56. At step S58, the CPU 141 sets the alternative mode to the programmed broadcast program, for which the operation mode (alternative operation mode) different from the operation mode set by the user at programming of recording is selected, and shifts into the alternative operation mode.

At step S59, the viewability/recordability determination unit 132 calculates the deficits of the resources (the deficit of the memory and the deficit of battery level), which are the deficits of the current memory and of the current battery level to the memory capacity and the battery level necessary to record all of the programmed broadcast programs, for the case where the operation mode set at programming of recording is adopted to each of the programmed broadcast programs and for the case where the operation mode requiring the least memory capacity and battery level is adopted to all of the programmed broadcast programs. Then, the viewability/recordability determination unit 132 inputs the deficits of resource (the deficit of the memory and the deficit of the battery level) to the CPU 141. In addition, the viewability/recordability determination unit 132 calculates up to which programmed broadcast program in the ascending order of the recording priority is cancelled to enable all of the other programmed broadcast programs to be recorded with the operation mode set at programming of recording and inputs a result of such calculation to the CPU 141. At a next step S60, the CPU 141 displays, on the display unit 143 via the display control unit 142, that all of recording of the programmed broadcast programs cannot be recorded because insufficient resources (the memory, the battery), recording priority of each programmed broadcast program, the programmed broadcast program, cancellation of whose programmed recording, calculated ascending order of the recording priority, enables all of the other programmed broadcast programs to be recorded with the operation mode set at programming of recording, and a selection screen to select whether to cancel the programming for such programmed broadcast program.

At a next step S61, it is selected by the user whether to cancel the programmed recording for the broadcast program displayed as a programming cancellation target on the selection screen at step S60. If it is selected to cancel the programmed recording, the operation proceeds to step S62, whereas the operation proceeds to step S63 if it is selected not to cancel. At a step S62, the CPU 141 cancels the programmed recording of the broadcast program displayed as the programming cancellation target (that is, programmed broadcast program with a low priority) displayed on the selection screen at step S61. Then, the CPU 141 deletes the operation mode for recording of the programmed broadcast program, recording priority and programming registration information (the broadcast start time, the broadcast end time, the program name, the broadcast channel, other information necessary for recording, and information on each of the memory capacity and the battery level necessary for recording in the operation mode set) stored in the memory 144. Moreover, the CPU 141 displays that the programmed recording is cancelled on the display unit 143 via the display control unit 142. At step S63, on the other hand, the CPU 141 displays, on the display unit 143 via the display control unit 142, the message indicating lack of the remaining resource (indicating that at least one of the memory or the battery level is insufficient for recording) as well as the deficit of the memory and the deficit of the battery level to a necessary memory and a necessary battery level with respect to each of a case where the operation mode set at programming of recording is adopted to each programmed broadcast program and a case where the operation mode requiring the least memory capacity and battery is adopted to all of the programmed broadcast program.

[Exemplary Display 3 of Program Guide]

FIG. 9 is a diagram illustrating an exemplary display 3 of the program guide by the mobile terminal according to the present invention. In the exemplary display 3, the recordable time (recordable time; a second recordable time) of each broadcast program depending on the remaining memory from the current time (in the example in the figure, 17:12) and the recordable zone corresponding to the recordable time are displayed for each tuner (broadcast system). It is also possible to display only the viewable time and the viewable zone related to the tuner activated. In the display example 3, the recordable time based on the remaining memory is 50 minutes for the channel M12, M18 of the MediaFLO broadcasting and 30 minutes for the channel D1, D3 and D7 of the digital broadcasting, and zones thereof are shown using the current time as a reference. Each column of the program guide shown in FIG. 9 is described below. It is assumed that recording of MediaFLO broadcasting consumes less power than recording of the digital broadcasting.

The display column V11 shows a channel number and a broadcast station or the broadcast channel name of each broadcast program.

The display column V12 shows hours.

The display column V13 shows the broadcast date (February 29, in the example shown in the figure) of the broadcast programs displayed.

The display column V14 shows a page number of a plurality of pages constituting the program guide. In the example shown in the figure, "5/14" represents "5th page of 14 pages".

The display column V15 shows a key used to display the menu screen. In the example shown in the figure, "Menu: 0" represents that the menu screen is displayed if the key of "0" is pressed down. The operation for switching display contents of the program guide to contents in another operation mode can be performed by selecting the menu in the display column V15 and then selecting the display operation mode switching function in the menu.

The display columns V16, V17 show a key used to display a previous page of a current page being displayed and a key used to display a following page, respectively, among the plurality of pages constituting the program guide. In the example shown in the figure, "Previous Page:*" represents that the 4th page is displayed if a key of "*" is pressed down (the 5th page is currently displayed), whereas "Next Page: #" in the display column V17 represents that the 6th page is displayed if a key of "#" is pressed down.

The display column V18 shows the operation mode corresponding to the recordable time being displayed. In the example shown in the figure, "Display Operation Mode: 2" represents that the recordable time being displayed corresponds to the operation mode 2.

The display column V19 shows the recordable time in the operation mode being displayed and also shows which of the remaining memory and the remaining battery level determines the recordable time. In the example shown in the figure, "Remaining: 30 Minutes" represents that the recordable time of the channel being selected (for example, the channel D1) in the operation mode displayed is 30 minutes. Additionally, the diagonal lines in the display column V19 indicates that a remaining time (30 minutes) depends on the remaining battery level.

The display column V20 shows the current date. In the example shown in the figure, "2/29 17:12" represents that it is "17:12 on February 29th" now.

In the program guide shown in FIG. 9, the recordable time of each broadcast program is (discriminately) shown as the recordable zone corresponding to the length of the recordable time by the diagonal lines as shown on Program 1, Program 6, Program 9 and so on. Since the recordable times (30 minutes) of the Program 1, the Program 6 and the Program 9 are shorter than the remaining broadcast time of those programs (48 minutes), the diagonal lines are provided in areas corresponding to the recordable times (30 minutes) from the current time (17:12) as a reference. In addition, since the recordable times (50 minutes) of Program 13 and Program 16 are shorter than the remaining broadcast times thereof (108 minutes), the diagonal lines are provided in areas corresponding to the recordable times (50 minutes) from the current time (17:12) as a reference.

[Exemplary Display 4 of Program Guide]

FIG. 10 is a diagram illustrating an exemplary display 4 of the program guide by the mobile terminal according to the present invention. In the exemplary display 4, the recordable time (video recordable time) of each broadcast program and the recordable zone corresponding to the recordable time, which are determined based on the remaining memory, are shown for each tuner (broadcast system) and for each broadcast program and, simultaneously, the aforementioned pop-up box of the message indicating lack of the remaining resource is displayed as well. It is also possible to display only the viewable time and the viewable zone related to the tuner activated. In the exemplary display 4, the recordable time based on the remaining memory is 50 minutes for the channels M12, M18 of the MediaFLO broadcasting and 30 minutes for the channels D1, D3 and D7 of the digital broadcasting, and the recordable zones thereof are displayed using the current time and the start time of the broadcast programs as references. Since each column in the program guide shown in FIG. 10 is identical to that in the program guide shown in FIG. 9, a description thereof is omitted. In addition, the difference in power consumption between the broadcast systems at recording is the same as that in FIG. 9.

In the program guide shown in FIG. 10, the recordable time of each broadcast program is (discriminately) shown as the recordable zone corresponding to a length of the recordable time by the diagonal lines in Program 1, Program 2, . . . , Program 6, . . . , Program 13, Program 16, and Program 17. Since the recordable times (30 minutes) of the Program 1 and the Program 2 are shorter than the broadcast times (broadcast program 1; 60 minutes, broadcast program 2; 120 minutes), the diagonal lines are provided in areas corresponding to the recordable times (30 minutes) from the broadcast start times (Program 1; 17:00, Program 2; 18:00) as a reference. In addition, since the recordable times (50 minutes) of the Program 13 and the Program 17 are shorter than the broadcast times (120 minutes), the diagonal lines are provided in areas corresponding to the recordable times (50 minutes) from the broadcast start times (Program 13; 17:00, Program 17; 19:00) as a reference time.

[Exemplary Display 5 of Program Guide]

FIG. 11 is a diagram illustrating an exemplary display 5 of the program guide by the mobile terminal according to the present invention. In the exemplary display 5, the recordable time (video recordable time) of each broadcast program and the recordable zone corresponding to the recordable time, which are determined based on the remaining memory and the remaining battery level, are shown for each tuner (broadcast system) and for each broadcast program. It is also possible to display only the viewable times and the viewable zones related to the tuner activated. In the exemplary display 5, the first recordable time based on the remaining battery level is 45 minutes for the MediaFLO broadcasting while 40 minutes for the digital broadcasting, and the second recordable time based on the remaining memory is 50 minutes for the MediaFLO broadcasting while 30 minutes for the digital broadcasting. Accordingly, the first recordable time< the second recordable time is satisfied, and thus the recordable time of each broadcast program of the channels M12, M13 of the MediaFLO broadcasting depending on the first recordable time is 45 minutes. On the contrary, the first recordable time> the second recordable time is satisfied, and the recordable time of the channels D1, D3 and D7 of the digital broadcasting depending on the second recordable time is 30 minutes. Since each column in the program guide shown in FIG. 11 is identical to that in the program guide shown in FIG. 9, a description thereof is omitted. In addition, the difference in power consumption between the broadcast systems is the same as that in FIG. 4, and a difference in memory usage at recording is the same as that in FIG. 9.

In the program guide shown in FIG. 11, the recordable time of each broadcast program is (discriminately) shown as the recordable zone corresponding to the length of the recordable time by the diagonal lines in Program 1, Program 2, . . . , Program 6, Program 7, . . . , Program 13, Program 14, and so on. Since the recordable times (30 minutes) of the Program 1 and the Program 2 are shorter than the broadcast times (broadcast program 1; 60 minutes, broadcast program 2; 120 minutes), the diagonal lines are provided in areas corresponding to the recordable times (30 minutes) from the broadcast start time (Program 1; 17:00, Program 2; 18:00) as a reference. In addition, since the recordable times (45 minutes) of the Program 13 and the Program 14 are shorter than the broadcast times (120 minutes), the diagonal lines are provided in areas corresponding to the recordable times (45 minutes) from the broadcast start times (Program 13; 17:00, Program 14; 19:00) as a reference.

According to the mobile terminal of the present invention which displays the program guide in the exemplary display 1, since the viewable zone corresponding to the viewable time determined based on the remaining battery level is discriminately shown from the current time in the program guide, it enables determination on whether the broadcast program is viewable upon viewing the program guide, thereby improving convenience for the user.

According to the mobile terminal of the present invention which displays the program guide in the exemplary display 2, since the viewable zone corresponding to the viewable time determined based on the remaining battery level is discriminately shown from the broadcast start time of each broadcast program in the program guide, it enables determination on whether the broadcast program is viewable upon viewing the program guide, thereby improving convenience for the user.

According to the mobile terminal of the present invention which displays the program guide in the exemplary display 3, since the recordable zone (video recordable zone) corresponding to the recordable time (video recordable time) determined based on the remaining memory is discriminately shown from the current time in the program guide, it enables determination on whether the broadcast program is recordable upon viewing the program guide, thereby improving convenience for the user. It is to be noted that, the same effect as the exemplary display 5 described below can be obtained, if the mobile terminal according to the present invention for displaying the program guide in the exemplary display 3 discriminately displays the recordable zone corresponding to the recordable time determined based on the remaining battery level and the remaining memory from the current time in the program guide.

According to the mobile terminal of the present invention which displays the program guide in the exemplary display 4, since the recordable zone (video recordable zone) corresponding to the recordable time (video recordable time) determined based on the remaining memory is discriminately shown from the broadcast start time of each broadcast program in the program guide, it enables determination on whether the broadcast program is recordable upon seeing the program guide, thereby improving convenience for the user.

According to the mobile terminal of the present invention which displays the program guide in the exemplary display 5, since the recordable zone (video recordable zone) corresponding to the recordable time (video recordable time) determined based on the remaining battery level and the remaining memory is discriminately shown from the broadcast start time of each broadcast program in the program guide, it enables determination on whether the broadcast program is recordable upon seeing the program guide, thereby improving convenience for the user. Moreover, since the recordable time is determined by using a smaller one between the remaining battery level and the remaining memory, it enables to display the recordable zone capable of recording without fail and allows the user to determine on availability of effective recording by the mobile terminal, which has a heavy restriction on a battery capacity. Thereby, the convenience for the user is even more improved.

In addition, according to the mobile terminal of the present invention, the viewable/recordable time when the setting information (operation mode information) is changed is discriminately shown in the program guide, it enables determination on whether the broadcast program is viewable/recordable when the operation mode is changed upon viewing the program guide, thereby improving convenience for the user.

Although the viewable/recordable times of all of the broadcast programs in the program guide are discriminately shown in the above exemplary displays 1 to 5 of the program guide, it is also possible to display the viewable/recordable time of only hours, the channels and the broadcast programs selected by the user.

In addition, although the viewable/recordable times in the program guide are discriminately shown by areas in predetermined patterns, the viewable/recordable times can be shown by color coding or shown with predetermined symbols (numbers and identification symbols).

Moreover, in the above exemplary displays 1 to 5 of the program guide, it is also possible to have a function, in addition to a function to display contents of the display column V20, to obtain contents of a selected broadcast program (the recording programmed broadcast program, a viewing programmed broadcast program, a broadcast program desired for viewing and the like) and information on casts and the like by wirelessly connecting to the program guide delivery server 302, or from the broadcast waves, and display them such that, after the broadcast program is selected, the menu in the display column V15 is selected to display information corresponding to the function in the menu selected.

Additionally, the program guide display apparatus, if obtaining the program guide from the broadcast waves, does not need to have the transmission and the reception unit as it for communication.

REFERENCE SIGNS LIST 100 program guide display apparatus (mobile terminal)
110 broadcast wave reception unit
111 broadcast wave tuner
112 broadcast wave demodulation unit
113 broadcast wave decoder
114 broadcast wave antenna
120 communication link transmission and reception unit
121 wireless transmission and reception unit
122 communication link antenna
130 detection and determination unit
131 necessary resource amount calculation unit
132 viewability/recordability determination unit
133 remaining memory detection unit
134 remaining battery level detection unit
140 common section
141 CPU
142 display control unit
143 display unit
144 memory
145 battery
146 operation unit
147 speaker
148 microphone
301 broadcast station
302 program guide delivery server
400 communication link network
401 wireless base station

The invention claimed is:
1. A program guide display apparatus comprising:
  a reception unit to receive a broadcast program by selecting a channel;
  an obtaining unit to obtain a program guide of each channel received by the reception unit;
  a display unit to display the program guide obtained by the obtaining unit;
  a memory unit to store setting information for viewing the broadcast program received by the reception unit;
  a remaining battery level detection unit to detect a remaining battery level;

a recording unit to record a broadcast program;
a remaining recording capacity detection unit to detect a remaining recording capacity of the recording unit;
and a control unit to determine a first recordable time based on the setting information stored in the memory unit and the remaining battery level detected by the remaining battery level detection unit and a second recordable time based on the remaining recording capacity detected by the remaining recording capacity detection unit,
wherein the control unit is to control the display unit to display a program zone in the program guide, the program zone corresponding to the broadcast program and having a value of a dimension corresponding to a duration of the broadcast program, the location of the program zone in the program guide being determined by at least one of the channel of the broadcast program and a broadcast time of the broadcast program, and
wherein the control unit is further to discriminately display within the program zone a recordable zone, the recordable zone having a value of the dimension corresponding to shorter recordable time between the first recordable time and the second recordable time.

2. The program guide display apparatus according to claim 1, wherein the recording unit has a memory unit to store a recording condition for recording a broadcast program,
and the control unit determines the second recordable time based on the recording condition stored in the memory unit of the recording unit and the remaining recording capacity detected by the remaining recording capacity detection unit.

3. The program guide display apparatus according to claim 1, wherein the control unit controls the display unit to discriminately display the recordable zone using a current time as a reference.

4. The program guide display apparatus according to claim 1, wherein the control unit controls the display unit to discriminately display a viewable zone of each broadcast program using a program start time as a reference.

5. A program guide display apparatus comprising:
a reception unit to receive a broadcast program by selecting a channel;
an obtaining unit to obtain a program guide of each channel received by the reception unit;
a display unit to display the program guide obtained by the obtaining unit; a memory unit configured to store setting information for viewing the broadcast program received by the reception unit;
a remaining battery level detection unit to detect a remaining battery level; a recording unit configured to record a broadcast program;
a remaining recording capacity detection unit to detect a remaining recording capacity of the recording unit; and
a control unit to determine a first recordable time based on the setting information stored in the memory unit and the remaining battery level detected by the remaining battery level detection unit and a second recordable time based on the remaining recording capacity detected by the remaining recording capacity detection unit,
wherein the control unit is to control the display unit to discriminately display a recordable zone in a program of the program guide according to a shorter recordable time between the first recordable time and the second recordable time.

6. The program guide display apparatus according to claim 2, wherein the control unit controls the display unit to discriminately display the recordable zone using a current time as a reference.

7. The program guide display apparatus according to claim 2, wherein the control unit controls the display unit to discriminately display a viewable zone of each broadcast program using a program start time as a reference.

8. The program guide display apparatus according to claim 1, wherein the value of the dimension of the recordable zone is less than that of the program zone.

9. The program guide display apparatus according to claim 1, wherein a fill of the program zone differs from a fill of the recordable zone.

10. The program guide display apparatus according to claim 1, wherein:
the control unit is further configured to control the display unit to display a plurality of additional program zones in the program guide, each of the additional program zones corresponding to a respective one of a plurality of additional programs in the program guide and having a value of a dimension corresponding to a duration of the respective one program, the location of each of the additional program zones in the program guide being determined by at least one of the channel of the respective one program and a broadcast time of the respective one program; and
the control unit is further configured to discriminately display within each of the additional program zones an additional recordable zone, the additional recordable zone having a value of the dimension corresponding to the shorter recordable time determined by the control unit.

* * * * *